Nov. 6, 1962  NIRO AKAHANE  3,062,091
MOTOR DRIVE FOR MOTION PICTURE CAMERA
Filed Nov. 10, 1959
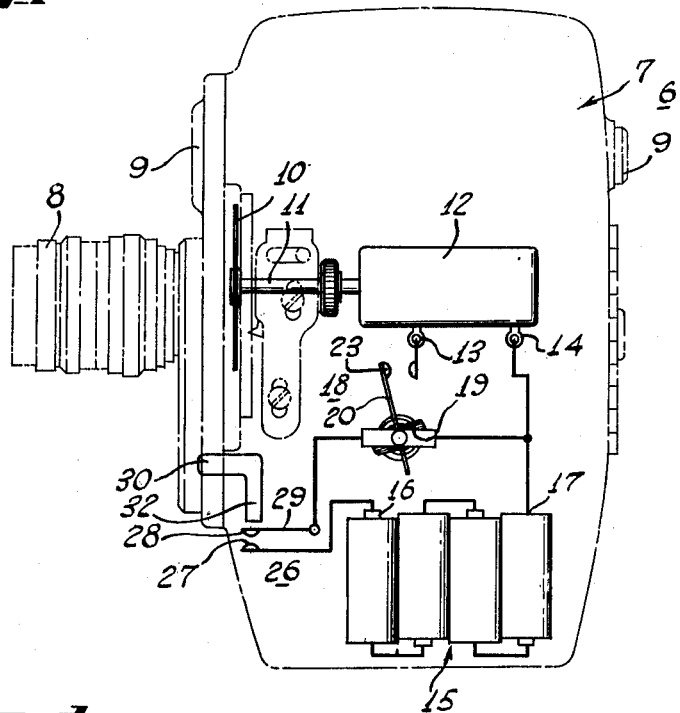
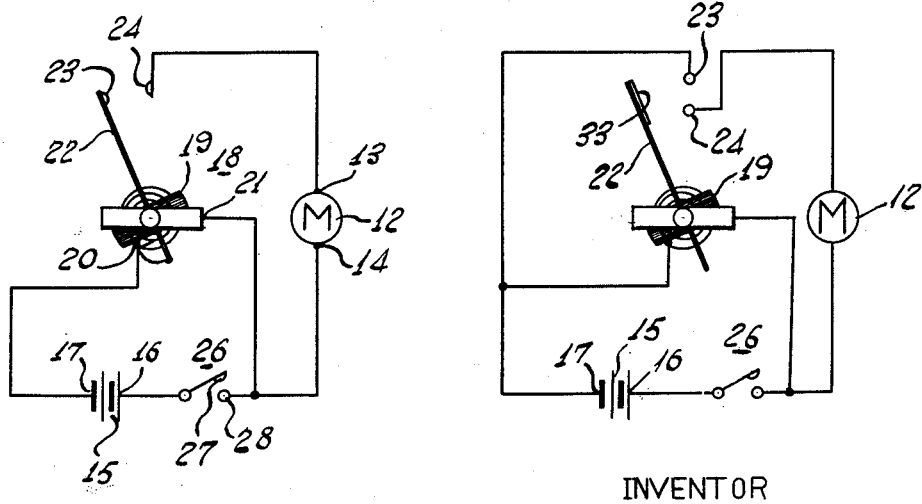
INVENTOR
NIRO AKAHANE
BY Stanley Wolder United States Patent Office 3,062,091
Patented Nov. 6, 1962

3,062,091
MOTOR DRIVE FOR MOTION PICTURE CAMERA
Niro Akahane, Shimosuwa-machi, Nagano-ken, Japan, assignor to Yashica Co., Ltd., Tokyo, Japan, a corporation of Japan
Filed Nov. 10, 1959, Ser. No. 852,085
Claims priority, application Japan Nov. 18, 1958
4 Claims. (Cl. 88—16)

The present invention relates generally to improvements in cameras and it relates more particularly to an improved electric battery motor driven motion picture camera.

The electric battery motor driven motion picture camera of conventional construction offers many advantages among which is its ability to actuate the camera for the full length or reel of film without the interruptions which normally accompany the use of spring driven cameras. Moreover, the drive spring and associated mechanism is obviated as are the frequent winding operations. However, these battery energized motor driven cameras possess an important drawback in that the camera speed is not uniformly constant. This is a consequence of the fact that the drive motor is not a constant speed motor and as the battery voltage falls below a predetermined value following a period of use or dormancy the speed of the drive motor as well as the camera speed are correspondingly below the desired speeds. This results not only in an improper frame speed but also in an overexposure of the film.

It is thus a principal object of the present invention to provide an improved motion picture camera.

Another object of the present invention is to provide an improved electric battery energized motor driven motion picture camera.

Still another object of the present invention is to provide an improved electric battery energized motor driven motion picture camera provided with means which permit the operation of the camera only at its desired speed.

A further object of the present invention is to provide an improved electric battery energized motion picture camera of the above nature characterized by its simplicity, ruggedness, compactness and low cost.

The above and other objects of the present invention will become apparent from a reading of the following description taken in conjunction with the accompanying drawing wherein:

FIGURE 1 is a side elevational view of an improved camera drive mechanism embodying the present invention, the camera body and components being illustrated by broken lines;

FIGURE 2 is a schematic view thereof; and

FIGURE 3 is a schematic view of another embodiment of the present invention.

In a sense the present invention contemplates the provision of a battery energized motor driven camera, comprising a shutter, an electric drive motor coupled to said shutter, an electric battery, and selectively operable switch means connecting said battery to said motor only upon the voltage of said battery exceeding a predetermined value. The camera is characterized in that it will only run at its rated speed by reason of the above switch arrangement since the circuit between the battery and the motor is completed only when the battery voltage is sufficient to drive the motor at the required speed. When the battery voltage is too low the circuit between the battery and the motor can not be closed thus insuring that the camera will not be run at below its rated speed and providing an indication of the battery consumption and its necessary replacement.

According to one form of the present invention the switching means includes a manually operable normally open switch, a voltmeter having an actuating coil and a swingable first contact carrying arm, and a second contact, located in the path of said first contact. The actuating coil is connected to the battery through the switch, and the motor is connected in series with the meter contacts and the switch to the battery. Thus upon the closing of the switch the meter is actuated to close the meter contacts only upon the presence of an adequate battery voltage to connect the motor to the battery, energizing the motor and driving the camera at the rated speed. In the event that the battery voltage is inadequate the motor contacts will not close and the motor is thus not energized. According to another form of the present invention the first meter contact is not carried by the meter arm but is located adjacent the second contact and the meter arm carries a shorting bar movable with the arm into engagement with the first and second contacts to effect their interconnection or closing.

Referring now to the drawings and more particularly to FIGURES 1 and 2 thereof which illustrate a preferred embodiment of the present invention, the reference numeral 6 generally designates a motion picture camera incorporating the improved motor control mechanism and including the conventional body or casing 7 having a lid to afford access into the camera case, a photographic lens 8 and viewing system 9. Located between the lens 8 and the path of the motion picture film is a rotatable disc type shutter 10 of well known construction and disposition which is coupled by way of a shaft 11 to a direct current electric motor 12 and is driven thereby in synchronism with the film frame advancing mechanism and with the film take up reel in the usual manner. The electric motor 12 is suitably mounted in the camera case 7 and includes a pair of first and second input terminals 13 and 14 respectively.

A battery receptacle or recess is disposed in the camera casing 7 and releasably holds a plurality of preferably dry cells which are interconnected in series relationship by contact elements carried by the receptacle to define an electric battery 15 including a pair of end poles 16 and 17 respectively. Also located in the camera casing 7 is an electrically actuated voltage responsive switch 18 which is defined by a voltmeter including a moving coil or armature 19 spring urged to its zero position and having a pair of input terminals 20 and 21. A radially extending needle or arm 22 is carried by the coil 19 and is swingable therewith and has mounted at the end thereof a first contact element 23. A second stationary contact element 24 is disposed in the path of the first contact element 23 and is so located as to be engaged thereby only when the voltage of the battery 15 exceeds a predetermined minimum value which is sufficient to drive the electric motor 12 at the desired speed and to swing voltage responsive arm 22 to close the contacts 23 and 24.

A manually or selectively operable normally open switch 26 is positioned in the camera casing 7 and includes a stationary first contact 27 and a spaced confronting second contact 28 mounted at the end of a resilient arm 29. A finger piece or shutter button 30 projects through the camera casing front wall and terminates at its inner end in a depending leg 32 which is in registry with the free end of the switch arm 29. The closing of the switch 26 is effected and maintained by the manual depression of the shutter button 30.

The various electrical elements are associated to complete the circuit network, the battery pole 17 being connected to the meter coil terminal 20 and to the meter contact 23 by way of the meter arm 22. The battery pole 16 is connected to the switch contact 27 the other switch contact 28 being in turn connected to the meter coil terminal 21 and the motor terminal 14. The other motor terminal 13 is connected to the stationary meter contact 24.

Considering now the operation of the improved camera drive mechanism, the button 30 is depressed to close the switch contacts 27 and 28 to complete the circuit between the meter coil 19 and the battery 15 and thereby energize the coil 19. If the battery voltage is above the predetermined minimum necessary to drive the motor at its required speed the coil 19 will be energized to move an amount to sufficiently swing the arm 22 to close the meter contacts 23 and 24. The closed meter contacts complete the circuit between the drive motor 12 and the battery 15 by way of the closed switch 27 to energize the motor 12 and drive the camera 6. Upon release of the button 30 the switch 26 opens to disconnect the battery from the motor 12 and the meter coil 19 to deenergize and stop the motor 12 and deenergize the coil 19 and open the meter contacts 23 and 24. In the event that the voltage of the battery 15 is below the predetermined minimum value, the meter contacts 23 and 24 will not close upon the energization of the meter coil 19 following the closing of the switch 26. As a result the motor 12 is not energized or driven, an indication that the battery 15 is depleted and requires replacement.

In FIGURE 3 of the drawing there is illustrated another embodiment of the present invention differing from that first described only in the arrangement and actuation of the meter contacts 23 and 24. Unlike the earlier embodiment the meter contact elements are both stationary and disposed in the path of a shorting or connecting bar 33 which is mounted at the end of the meter arm 22. The contact element 23 is connected directly to the battery pole 17 and not through the arm 22. In all other respects the present embodiment is identical to that earlier described. Upon adequate energization of the meter coil 19 by the battery 15 the shorting bar 33 is swung by the arm 22 into shorting engagement with the contacting 23 and 24 effecting the closing thereof. The operation of the device is otherwise similar to that previously described.

The advantage of the last described embodiment of the present invention over the first described embodiment is that the operation of the meter 18 is in no way disturbed by the energization of the motor 12, since none of the motor current passes through any part of the meter mechanism per se.

While there have been illustrated and described preferred embodiments of the present invention it is apparent, that numerous alterations, additions and ommissions may be made without departing from the spirit thereof.

What is claimed is:

1. An improved motion picture camera of the character described comprising a shutter, an electric drive motor coupled to said shutter, an electric battery, a normally open switch, a voltmeter having an energizing coil connected through said switch to said battery and having a swingable arm carrying a shorting bar, a pair of spaced contacts located in the path of said bar and adapted to be interconnected thereby, said contacts being connected in series with said motor and said switch across said battery, said shorting bar being carried into engagement with said contacts by said voltmeter only when the voltage of said battery is sufficient to drive said motor at a predetermined speed and upon the closing of said switch.

2. An improved motion picture camera of the character described comprising a shutter, an electric drive motor coupled to said shutter, an electirc battery, a normally open switch, a voltmeter having an energizing coil including first and second input terminals and having a swingable arm carrying a first contact, a second contact located in the path of said first contact, said first contact being connected to said coil first terminal and to one pole of said battery, the other pole of said battery being connected in series with said switch to said coil second terminal and through said motor to said second contact, said first contact being swung into engagement with said second contact only when the voltage of said battery is sufficient to drive said motor at a predetermined speed and said switch is closed.

3. An improved motion picture camera of the character described comprising a shutter, an electric drive motor coupled to said shutter, an electric battery, a normally open switch, a voltmeter having an energizing coil including first and second input terminals and having a swingable arm, a pair of normally open first and second contacts actuatable to a closed position by said swingable arm said first contact being connected to said coil first terminal and to one pole of said battery, the other pole of said battery being connected in series with said switch to said coil second terminal and through said motor to said second contact, said contacts being actuated to a closed position by said voltmeter only when the voltage of said battery is sufficient to drive said motor a predetermined speed and said switch is closed.

4. An improved camera in accordance with claim 3 wherein said arm carries a shorting bar and said contacts are located in the path of said shorting bar.

References Cited in the file of this patent

UNITED STATES PATENTS

| 653,685 | Maxim | July 17, 1900 |
| 674,947 | Tolchard | May 28, 1901 |
| 2,187,356 | Malek | Jan. 16, 1940 |
| 2,452,127 | James | Oct. 26, 1958 |
| 2,912,898 | Oxberry | Nov. 17, 1959 |
| 2,914,704 | Nesler et al. | Nov. 24, 1959 |
| 2,971,432 | Blank | Feb. 14, 1961 |
| 3,001,099 | Larkey | Sept. 19, 1961 |

FOREIGN PATENTS

| 218,929 | Australia | Sept. 5, 1957 |